United States Patent [19]

Bonnerot et al.

[11] 4,304,000

[45] Dec. 1, 1981

[54] DEVICE FOR SUPERVISING A TRANSMULTIPLEXER

[75] Inventors: Georges Bonnerot, Orsay; Patrice Senn, Feucherolles; Michel Coudreuse, Paris, all of France

[73] Assignee: Telecommunications Radioelectriques et Telephoniques T.R.T., Paris, France

[21] Appl. No.: 41,041

[22] Filed: May 21, 1979

[30] Foreign Application Priority Data

May 29, 1978 [FR] France .................. 78 15891

[51] Int. Cl.³ .................. H04J 4/00; H04J 1/05
[52] U.S. Cl. .................. 370/70; 370/50; 370/74
[58] Field of Search .................. 370/70, 74, 50

[56] References Cited

U.S. PATENT DOCUMENTS

| | | | |
|---|---|---|---|
| 4,009,350 | 2/1977 | Cabet | 370/74 |
| 4,074,073 | 2/1978 | Eldsmo | 370/74 |
| 4,101,738 | 7/1978 | Bellanger | 370/70 |

Primary Examiner—David L. Stewart
Attorney, Agent, or Firm—Thomas A. Briody; William J. Streeter; Laurence A. Wright

[57] ABSTRACT

To supervise the operation of an arithmetic unit of a digital transmultiplexer intended to convert a TDM-signal into a FDM-signal and vice versa, a pilot signal is utilized as the test signal which pilot signal is also used to control the level of the received FDM-signals and is processed in the transmultiplexer. The pilot signal selection filter used for controlling the level is used, also in time-division multiplex, for selecting a component having a frequency equal to the pilot signal frequency and occurring in each of the two input and output signals of the arithmetic unit.

2 Claims, 4 Drawing Figures

4,304,000

DEVICE FOR SUPERVISING A TRANSMULTIPLEXER

BACKGROUND OF THE INVENTION

The invention relates to a digital transmultiplexer intended to convert a signal consisting of a plurality of telephony signals in TDM-format to a signal consisting of the said telephony signals in FDM-format and vice versa, the transmultiplexer comprising an arithmetic unit having on the one hand a first input and a first output for receiving and supplying, in digital form, the said signals in TDM-format and on the other hand a second input and a second output for receiving and supplying, in digital form, the said signals in FDM-format, the last-mentioned signals being located in a frequency band which is at least a frequency interval $\Delta F$ removed from the zero frequency, $\Delta F$ being the bandwidth of a telephony signal, the arrangement further comprising, to control the level of the signal in FDM-format, a digital generator for generating a pilot signal having the prescribed frequency, which is applied to the above-mentioned first input, the arrangement further comprising, to control the level of the received signals in FDM-format, a digital filter for selecting a pilot signal, the filter being connected to the above-mentioned first output.

Hereinafter "a signal in TDM-format" will be denoted TDM-signal for brevity. Correspondingly, "a signal in FDM-format" will be denoted FDM-signal.

Telephone networks in which TDM-systems as well as FDM-systems are used, utilize transmultiplexers for coupling these two different types of transmission systems to one another.

SUMMARY OF THE INVENTION

A known arrangement of the type defined in the opening paragraph is described in the article entitled "Transmultiplexeur numérique à 60 voies", published in the periodical *Cables et Transmission*, October 1977, pages 444 to 463, inclusive. More detailed information of the known arrangement described there is given in the French patent application No. 2,188,920.

This known transmultiplexer is arranged to convert a TDM-signal into a FDM-signal and vice versa, using digital means only. To that end this transmultiplexer comprises a discrete Fourier transformer and a polyphase network.

As the Fourier transformer and the polyphase network can be used for converting a TDM-signal into an FDM-signal as well as for converting a FDM-signal into a TDM-signal, and as no channel-bound circuits are used for this conversion, it is necessary to detect an improper functioning of the arrangement immediately. To that end the transmultiplexer comprises supervising means.

The invention has for its object to supervise the transmultiplexer so that the means required therefore are constituted as far as possible by the means already present in the transmultiplexer.

According to the invention, to supervise the operation of the arithmetic unit, the said digital filter, which is arranged for selecting a pilot signal having a predetermined frequency, is also arranged for the selection of a component having the said predetermined frequency from each one of two signals, a first signal of which is constituted by the signal which was sampled with a frequency of $2\Delta F$, present at the second input and the second signal by the signal which was sampled with a frequency of $2\Delta F$, present at the second output of the arithmetic unit, as well as for the selection of the said frequency components from a third and a fourth signal constituted by the signal applied to the first input of the arithmetic unit and the signal occurring at the first output of the arithmetic unit, respectively, each one of the frequency components being characteristic of a certain pilot signal and being applied to detection circuits for producing level signals which are compared with thresholds.

DESCRIPTION OF THE DRAWINGS

The invention will now be explained by way of non-limitative example with reference to the accompanying Figures.

FIG. 4 shows the spectrum of the FDM-signal at the second input $E_2$ or at the second output $S_2$, after sampling with a frequency $2\Delta F$.

DESCRIPTION OF THE PREFERRED EMBODIMENT

Figure 1:
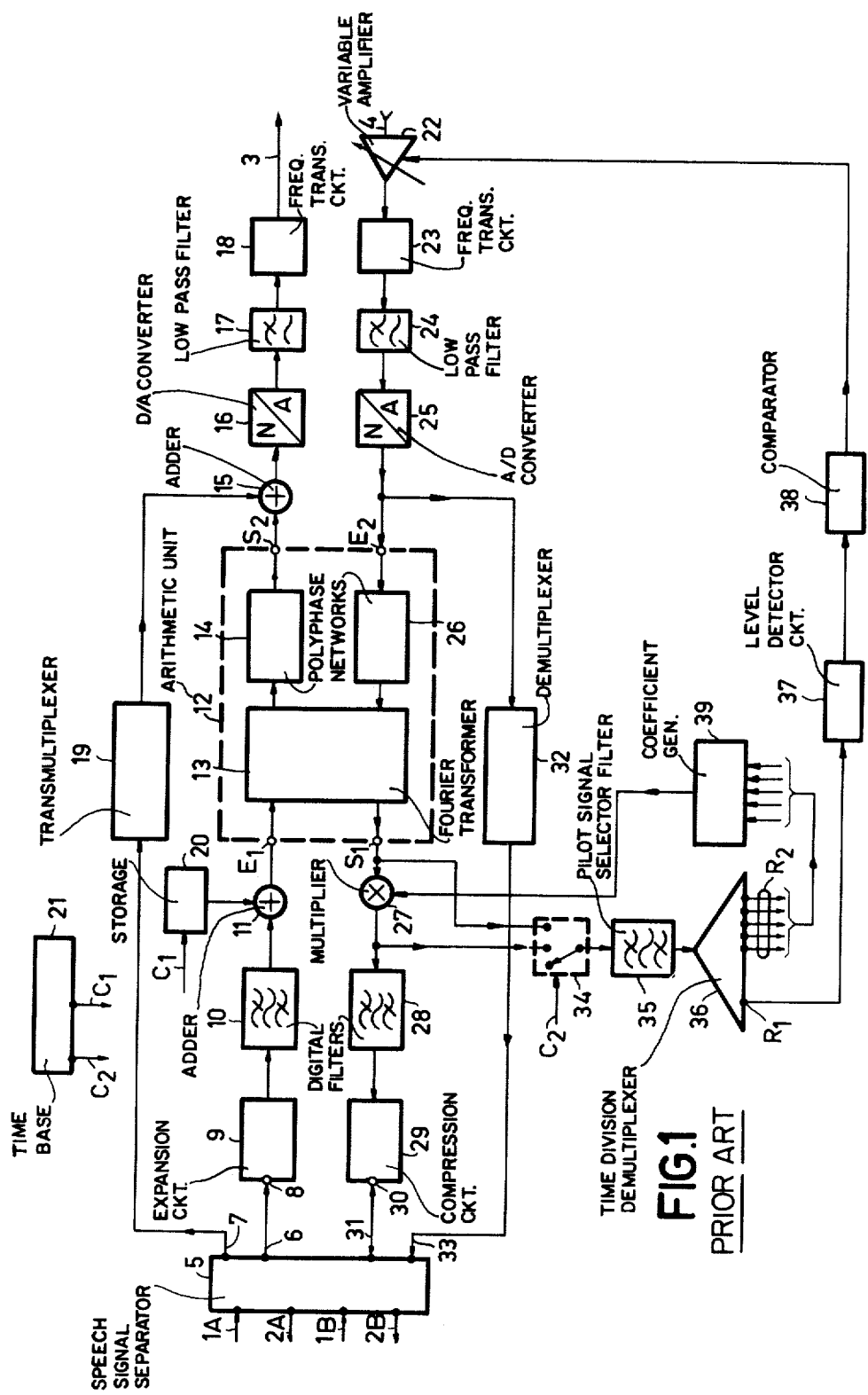
FIG. 1 shows schematically an embodiment of a known digital transmultiplexer.

The transmultiplexer shown in FIG. 1 is arranged for converting two TDM-signals, each comprising 30 channels, into a FDM-signal consisting of 60 channels. A bit rate of 2048 kbits/sec. is associated with each of these TDM-signals and these signals are applied via inputs 1A and 1B to the transmultiplexer, which thereafter produces the desired FDM-signal at its output 3.

This transmultiplexer, shown in FIG. 1, is also arranged for converting a FDM-signal, consisting of 60 channels, into two TDM-signals, each comprising 30 channels. Also now a bit rate of 2048 kbits/sec. will be associated with each one of the TDM-signals and these signals occur at the outputs 2A and 2B, respectively, whereas the FDM-signal is applied to this transmultiplexer via an input 4.

It should be noted that the FDM-signal generated by the transmultiplexer will in practice be located in the frequency band of 312–552 kHz. The same applies to the FDM-signal applied to this transmultiplexer via the input 4.

In the transmultiplexer shown in FIG.1 the two TDM-signals which are to be converted into a FDM-signal are supplied via the inputs 1A and 1B to a unit 5 in which the 30 speech signals in each of these TDM-signals are separated from co-transmitted signals. The 60 speech signals are assembled into a 64 channels TDM-signal, which signal consequently comprises 4 empty channels. The TDM-signal thus obtained is applied to the output 6 of the unit 5. As regards the auxiliary signals it should be noted that this concerns mainly the 60 signalling signals which accompany the 60 speech signals and that these signals occur, also in TDM-format, at the other output 7 of the unit 5.

The output 6 of the unit 5 is connected to the input 8 of an expansion device 9, in which each incoming 8-bit PCM-number is converted into a 12-bit PCM-number.

The output of the expansion device 9 is connected to a digital filter 10, which is arranged to limit the frequency band, occupied by each one of the speech signals to the frequency band of 300 to 3400 Hz customary for telephone transmission.

The output of the filter 10 is connected to the first input $E_1$ of an arithmetic unit 12 via an adder 11. This arithmetic unit 12 comprises, arranged between its input $E_1$ and its output $S_2$, the cascade arrangement of a Fourier transformer 13, which processes 64 signals, 60 of these signals being unequal to zero, and a polyphase network 14, having 128 branches. This cascade arrangement is described in detail in, for example, the French Pat. No. 2,188,920. By means of this arithmetic unit 12, the telephony signals presented in TDM-format are converted into FDM-format. The digital FDM-signal thus occurring at the output $S_2$, has a frequency spectrum located in the frequency band of, for example, 8-248 kHz, a sampling frequency of 512 kHz being associated with this signal. The four unoccupied channels are located in the band 0-8 kHz and 248-256 kHz, respectively.

The FDM-signal occurring at the output $S_2$ is applied, via an adder 15 to a digital-to-analog converter 16, to the output whereof a low-pass filter 17 is connected. The FDM-signal occurs in analog form and located in the frequency band of 8 to 248 kHz, at the output of this low-pass filter 17. By means of a frequency translation circuit 18 this FDM-signal is translated to the band of 312 to 552 kHz, namely by modulating this FDM-signal on a carrier having a frequency of 560 kHz and by applying the modulated signal thus obtained to a low-pass filter. The desired FDM-signal thus obtained now occurs at the output 3.

Figure 2:
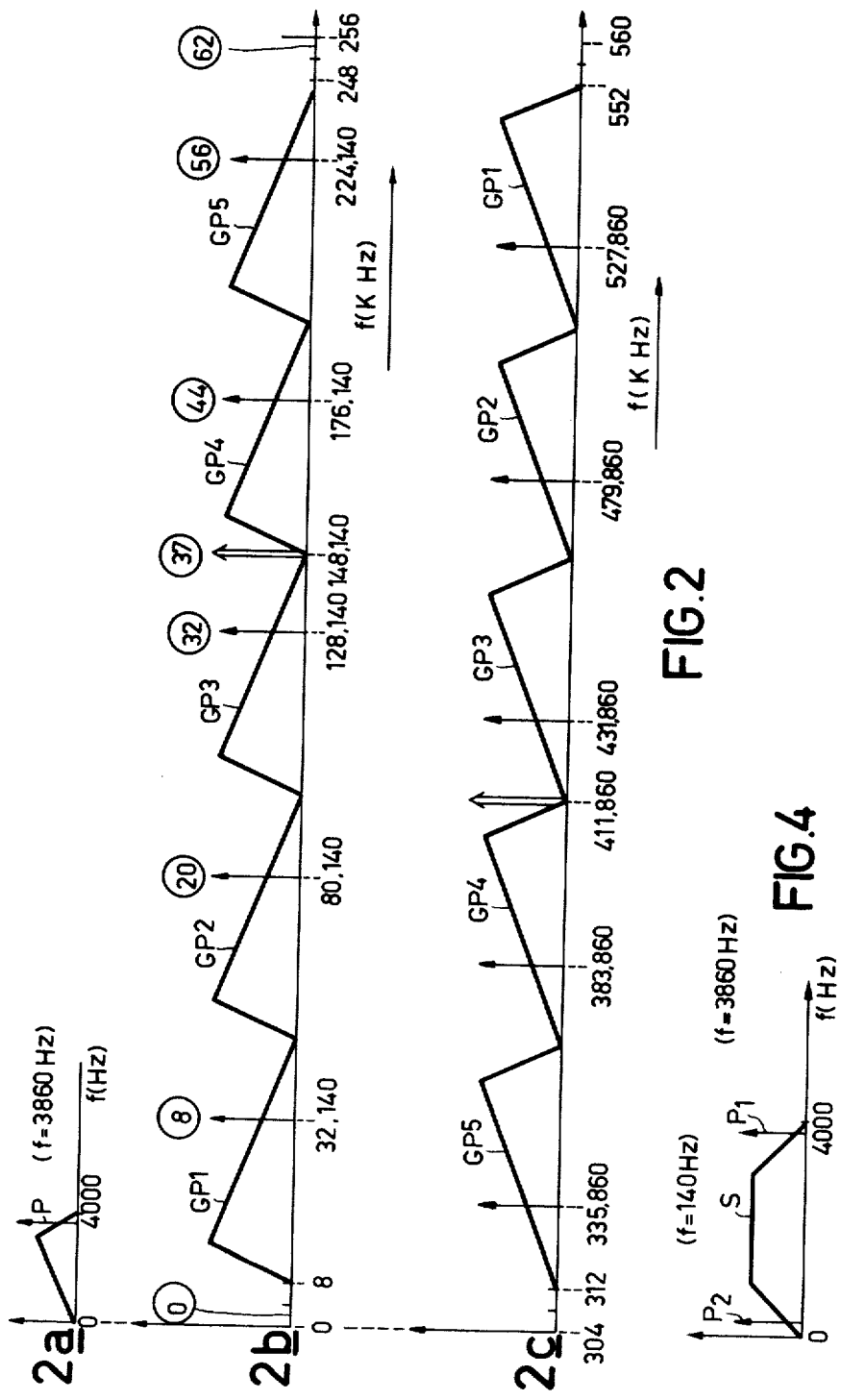
FIG. 2 shows the frequency spectra of different signals occurring in the transmultiplexer shown in FIG. 1;
 the diagram 2a of FIG. 2 shows the spectrum of a signal in a TDM-channel at the first input $E_1$ or at the first output $S_1$ of the arithmetic unit 12,
 the diagram 2b of FIG. 2 shows the spectrum of the FDM-signal at the second input $E_2$ or at the second output $S_2$ of the arithmetic unit 12;
 the diagram 2c of FIG. 2 shows the spectrum of the FDM-signal after frequency translation.

For a better understanding of the invention it is useful to examine already here the frequency spectra of the signals occurring at different points after the output $S_2$ of the arithmetic unit 12 more closely, taking as the starting point a speech signal having the spectrum shown in diagram 2a of FIG. 2.

Let us assume, for simplicity, that this speech signal occupies the entire band of 0 to 4 kHz, which corresponds to a channel bandwidth of 4 kHz.

The diagram 2b shows, on a different frequency scale, the spectrum of the digital FDM-signal occurring at the output $S_2$ and located in the band of 0 to 256 kHz. This 256 kHz frequency is half the 512 kHz sampling frequency. This diagram 2b also represents the spectrum of the analog signal before frequency translation by the translation circuit 18. In the spectrum of the diagram 2b the 60 speech channels occupy a bandwidth of 240 kHz, located between 8 and 248 kHz. This spectrum is divided into 5 portions, each portion corresponding to a primary group of 12 channels and constitute together a secondary FDM-group. In each channel the sequence of the frequencies is inverted with respect to those of diagram 2a. The primary groups are denoted by $GP_1$ to $GP_5$ inclusive, in order of increasing frequencies. Taking the four empty channels, which occupy the bands 0-8 kHz and 248-256 kHz, into consideration, the 64 channels are numbered from 0 to 63 in order of increasing frequencies; the encircled numbers indicate the numbers of the channels.

Finally, the diagram 2c represents the spectrum of a secondary FDM-group appearing at the analog output 3. The frequency translation performed in the circuit 18, shifts the secondary FDM-group to the band of 312-352 kHz.

The secondary FDM-group signal transmitted at the analog output 3 must contain, in addition to the 60 speech signals, the signalling and pilot signals associated therewith.

The 60 signalling signals occurring in TDM-format at the output 7 of the unit 5 are translated into a digital FDM-signalling signal, namely by means of a transmultiplexer device 19, which is constructed in the manner described in the above-mentioned article in "Cables et Transmissions", and more particularly in the French Pat. No. 7,517,717. This device 19 produces, at a rate of 512 kHz numbers which represent samples of the 60 signalling signals in FDM-format, such a signal occurring at one of the 60 multiples of 4 kHz in the frequency band of 12 kHz-248 kHz. By means of the adder 15 these numbers are added to the numbers occurring at the output $S_2$ of the arithmetic unit 12. In this manner the signalling signals appear in their accurately defined places in the secondary FDM-group occurring at the output 3.

This secondary FDM-group must also comprise 6 pilot signals, having accurately defined frequencies, for use at the receiving end for the control of the level of the secondary FDM-group in its entirety and of each one of the 5 primary groups individually.

The five primary group pilot signals must have the frequencies indicated by single arrows in the diagram 2c of FIG. 2 and the secondary group pilot signal must have the frequency 511.860 kHz. This frequency is indicated in the diagram 2c of FIG. 2 by means of a double arrow.

At the inputs of the translation device 18 the primary group pilot signals must have the following frequencies: 32.140 kHz, 80.140 kHz, 128.140 kHz, 176.140 kHz, and 224.140 kHz, respectively, and the secondary group pilot signals must have the frequency 148.140 kHz (see diagram 2b). It should be noted that the primary group pilot signals are located in the even-numbered signals 8, 20, 32, 44, 56 whereas the secondary group pilot signal is located in the odd-numbered channel 37.

For the generation of these pilot signals use is made of a store 20, for example a ROM, wherein numbers are stored which represent the samples of a 3860 kHz sinusoidal signal which is sampled with 8 kHz. This signal P which will be denoted the base band pilot signal, is indicated in the diagram 2a by means of an arrow. By means of a suitable read signal $C_1$, produced by a time base 21 the samples of the baseband pilot signal are read from the store 20. The numbers representing these samples are added in the adder 11 to the numbers produced by the filter 10. Pilot signals having the frequencies indicated in the diagram 2b now occur in the signal at the output $S_2$ of the arithmetic unit 12.

The analog FDM-signal which is applied to the input 4 of FIG. 1, and is also constituted by a secondary FDM-group, having the frequency spectrum shown in the diagram 2c, and comprises signalling and pilot signals is applied to a variable amplifier 22 for setting the level of the received secondary group.

The output signal of this amplifier 22 is applied to a frequency translation circuit 23 wherein it is demodulated by means of a carrier signal having a frequency of 560 kHz; the demodulated signal is applied to a low-pass filter 24, which produces the secondary FDM-group signal located in the band of 8 to 248 kHz and whose spectrum is shown in the diagram 2b.

The secondary FDM-group signal thus obtained is applied to an analog-to-digital converter 25 in which it is sampled with 512 kHz and thereafter linearly encoded.

The digital signal thus obtained is applied to the input $E_2$ of the arithmetic unit 12. This arithmetic unit 12 comprises, arranged between its input $E_2$ and its output $S_1$, a polyphase network 26 having 128 branches and an inverse Fourier transformer for 24 channels. The latter can be constituted by a unit which is fully independent of the Fourier transformer 13 used for the other conversion device; but, alternatively, it is possible to have the Fourier transform, as well as the inverse Fourier transform, be performed by one and the same device 13, for which purpose this device performs the two processing operations in time-division multiplex.

The TDM-signal obtained at the output $S_1$ is applied to a digital filter arrangement 28 via the multiplier 27. This filter arrangement 28 can be implemented in the same manner as the filter arrangement and has for its object to limit the signals in each channel to the band of 300 to 3400 Hz. Particularly the signalling signals and the pilot signals are suppressed with this filter 28.

The TDM-signal occurring at the output of the filter 28 and which only comprises the speech signals, is applied to the compression circuit 29 wherein the linearly encoded samples are compressed in each channel in accordance with a logarithmic compression characteristic for the generation of 8-bit numbers.

The TDM-signal occurring at the output 30 of the compression circuit 29 is applied to the input 31 of the unit 5 wherein it is split into two groups of 30 speech signals in TDM-format, these groups occurring at the output 2A and 2B, respectively.

For the generation of the signalling signals to be inserted into the two output signals use is made of a demultiplexer 32, which performs a function which in the inverse of the function performed by the multiplexer and which is connected to the output of the A/D converter 25. The signalling signals produced by this demultiplexer 32 in TDM-format are applied to the input 33 of the unit 5, where these signalling signals are fed into the two channels of the outgoing PCM-series intended therefore.

A pilot signal selection filter 35, having a narrow band around the frequency of 3860 Hz is provided for setting the level of the secondary FDM-group and of the primary FDM-groups, constituting this secondary FDM-group, received at 4. This filter 35 is connectable to the input of the multiplier 27 and to the output of this multiplier by means of a switching circuit 34, which is shown symbolically only in the Figure. This switching circuit 34 is controlled by a control signal $C_2$ derived from the time base 21. More particularly, the filter 35 is connected to the input of the multiplier 27 if the channel wherein the secondary group pilot signal has been accommodated, occurs in the TDM-signal. In addition, the filter 35 is connected to the output of the multiplier 27 each time a channel which accommodates one of the five primary group pilot signals occurs in the TDM-signal.

In these 6 channels the pilot signals are all located in the baseband and each of them has the frequency 3860 Hz, as shown in the diagram 2a of FIG. 2.

So the filter 35 selects, in time-division multiplex, the pilot signals of the secondary group and those of the primary groups.

The output of the filter 35 is connected to a time-division demultiplexer 36, which comprises an output $R_1$ and five outputs $R_2$. This demultiplexer 36 is arranged for producing the secondary group pilot signal at its output $R_1$ and a primary group pilot signal at each of its outputs $R_2$.

The output $R_1$ is connected to a level detection device 37 wherein the level of the pilot signal of the secondary FDM-group is processed for generating a level signal which is representative of the level of the secondary FDM-group received at 4. Thereafter, this level signal is compared with thresholds in the circuit 38; finally, the comparison signal obtained is used for setting the gain of the variable multiplier 22.

The outputs $R_2$ are connected to a coefficient generating device 39 wherein several functions are combined.

Firstly, the level of the five pilot signals of the primary group is set in this arrangement 39; thereafter the five level signals are compared with thresholds; finally, the five comparison signals thus obtained are used for the formation of five multiplication coefficients, which are applied to the multiplier 27 in time-division multiplex. When the numbers in the channels of a primary group ($GP_1$, $GP_2$, $GP_3$, $GP_4$ or $GP_5$) appear at the output $S_1$ of the arithmetic unit 12, these numbers are multiplied by the adjusted coefficient. In this manner a control loop is effected for the primary groups wherein the multiplier 27 plays the role of control element.

In the circuit described above for the digital processing of the speech channels, the incoming TDM-signal as well as the incoming FDM-signal are processed in the arithmetic unit 12 so that a disturbance in an element of this arithmetic unit 12 might derange all channels. In the situation wherein the same Fourier transformer 13 is used for each of the two converters, a disturbance of an element of this transformer might derange all the processed channels in the two directions of conversion. Processing errors can also be made in the expansion device 9 and the compression device 29 as well as in the digital filters 10 and 28, so that a channel signal is fully or partly deranged.

To enable an earliest possible detection of errors in the processing operation of the signals, the transmultiplexer comprises means for supervising the transmultiplexer and for detecting any disturbance in the processing of the speech channels.

Figure 3:
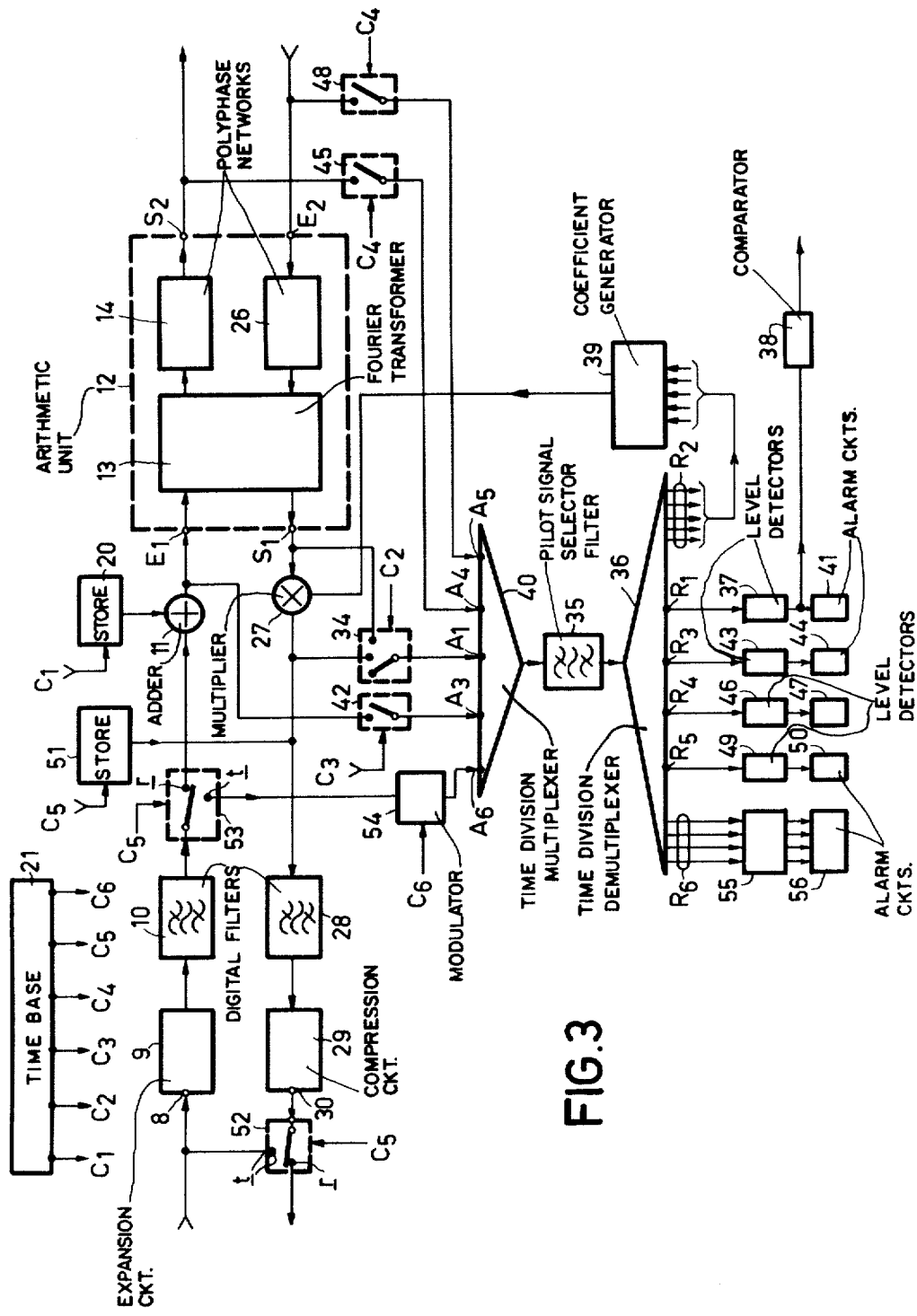
FIG. 3 shows schematically the transmultiplexer according to the invention.

The above-mentioned means will be described with reference to FIG. 3 wherein elements corresponding to those in FIG. 1 are given the same reference numerals.

In order to supervise the operation of the arithmetic unit 12, the pilot signal of the seconary FDM-group is used as the test signal which is usually present with a certain level in a certain channel (No. 37) at the four points $E_1$, $S_1$, $E_2$, $S_2$ of the arithmetic unit 12. By checking whether the level of the pilot signal occurring at the input $E_1$, this pilot signal being converted by the transmultiplexer into the secondary group pilot signal occurring at the output $S_2$, corresponds to the level of this secondary group pilot, the proper operation of the arithmetic unit 12 can be ascertained with a very high degree of certainty. The same indication can be obtained for the other converter by comparing the level of the secondary group pilot signal in the frequency-division multiplex signal, applied to the input $E_2$ with the level of the corresponding pilot in the TDM-signal occurring at the output $S_1$.

For the selection of the different pilot signals use is made of the selection filter 35, whose passband is located around 3860 Hz. The input of this filter 35 is connected to the output of a time-division multiplexer 40, which has five inputs $A_1, A_3, A_4, A_5, A_6$. The output of the filter 35 is connected to the input of a time-division demultiplexer 36, which has outputs $R_1, R_2, R_3, R_4, R_5, R_6$.

For the control of the level of the primary and secondary FDM-groups the input $A_1$ of the time-division multiplexer 40 is connected to the output of the switching device 34. In an analogous manner as in FIG. 1 there now occurs at the output $R_1$ of the demultiplexer 36 the pilot signal of the secondary FDM-group with a frequency of 3860 Hz, this signal being converted in the device 37 into a level signal for controlling the gain of the amplifier 22 via the circuit 38. The five pilot signals for the primary groups, which are utilized for setting the level of the primary groups via the device 39, again occur at the outputs $R_2$ of the demultiplexer 36.

It should be noted that one of the signals necessary for supervising the arithmetic unit 12 occurs already at the output of the device 37; namely a signal which is characteristic of the level of the pilot signal of the secondary group at the output $S_1$ of the arithmetic unit 12. This level signal is applied to an alarm circuit 41, which furnishes an alarm in case of an incorrect level.

Another signal necessary for the supervision of the arithmetic unit 12 is the level of the secondary group pilot signal present in the TDM-signal and applied to the input $E_1$ of the arithmetic unit 12. At this input this pilot signal has a frequency of 3860 Hz, is present in a certain channel (namely channel No. 37) and has the fixed level determined by the content of the store 20. To select this pilot signal, the input $A_3$ of the multiplexer 40 is connected to the input $E_1$ of the arithmetic unit via the break circuit 42, which is shown as a contact and is controlled by a control signal $C_3$. The pilot signal thus selected by the filter 35 appears at the output $R_3$ of the demultiplexer 36. This output $R_3$ is connected to the cascade arrangement of a level detector circuit 43 and an alarm circuit 44.

Another signal required for the supervision of the arithmetic unit 12 is the level of the secondary group pilot signal at the output $S_2$ of the arithmetic unit 12. As shown in the diagram 2b of FIG. 2, this secondary group pilot has a frequency of 148.140 kHz and is present in the odd channel No. 37. The pilot signals of the primary groups are situated at frequencies located in channels having an even number. To obtain a signal which is representative of the level of the secondary group pilot signal, the input $A_4$ of the multiplexer is connected to the output $S_2$ via a sampling device 45, shown symbolically only. This sampling device 45 is controlled by a control signal $C_4$ and takes samples of the FDM-signal with a frequency of 8 kHz. Consequently, a signal whose spectrum is shown in FIG. 4 in the band 0 to 4000 Hz is obtained at the output of the sampling device 45. This spectrum comprises a signal which is represented by the curve S and is produced by the speech signals of all channels. In addition, this spectrum comprises a component $P_1$ having a frequency of 3860 Hz and which represents the secondary group pilot signals, as well as a component $P_2$ having a frequency 140 Hz, whose amplitude is equal to the sum of the 5 primary group pilot signals.

The signal produced by the sampling device 45 is applied to the input $A_4$ of the multiplexer 40 in response whereto a signal, which is characteristic of the secondary group of pilot signals present in the signal at the output $S_2$ of the arithmetic unit 12, occurs at the output $R_4$ of the demultiplexer 36. This signal is thereafter applied to a cascade arrangement of a level detection circuit 46 and an alarm circuit 47.

The last signal required for supervising the arithmetic unit 12 is the level of the secondary group pilot signal present in the FDM-signal at the input $E_2$ of the arithmetic unit 12. Owing to the control loop of the secondary FDM-group received at 4, the level of this pilot signal is unchanged. Also this secondary group pilot signal is obtained by means of a sampling device 48 connected between the input $E_2$ of the arithmetic unit 12 and the input $A_5$ of the multiplexer 40. In response to the signal occurring at the input $A_5$ the output $R_5$ of the demultiplexer 36 produces a signal which is applied to the cascade arrangement of a level detection circuit 49 and an alarm circuit 50.

The pilot signal selection filter 35, the multiplexer 40 and the demultiplexer 36 can also be advantageously used for supervising the operation of the circuits 9, 10, 28 and 29.

As mentioned hereinbefore, the 60 speech signals which are applied to the expander 9 are distributed over 60 time slots of a multiple frame comprising 64 time slots. This multiple frame comprises therefore 4 empty time slots. Also the 60 speech signals occurring at the output $S_1$ of the arithmetic unit are distributed over 60 time slots of a multiplex frame having 64 time slots, so that also this multiplex frame has 4 empty time slots. These empty time slots are used for the supervision of the circuits 9, 10, 28 and 29. Hereinafter it will be assumed that the expansion device 9 and the filter device 10 are each constituted by a parallel arrangement of 4 expansion circuits and 4 filter circuits, respectively. Each of these circuits operates on 15 speech signals which are distributed over 16 time slots of a multiplex frame which, consequently, comprises an empty time slot which can be utilized for supervising each circuit. The filter device 28 and the compression device 29 are subdivided in the same manner into 4 filter and 4 compression circuits.

For the supervision of the operation of the circuits 9, 10, 28 and 29, numbers are applied to the input of the filter 28 in each of the 4 empty time slots which represent samples of a sinusoidal signal sampled with 8 kHz and having a frequency of 1860 Hz. These numbers are stored in a store 51, for example in the form of a ROM, and are applied to the input of the filter 28 under the control of a control signal $C_5$ generated by the time base 21 at the instants coinciding with the four empty time slots.

A switching circuit 52 is connected to the output 30 of the compression device 29 and a switching circuit 53 to the output of the filter 10. These switching circuits are controlled by the control signal $C_5$ namely so that each time one of the empty time slots occurs, these switches are moved to the position t, and to the position r at the occurrence of the other time slots. In the position t the output of the store 51 is connected to the input of a modulation circuit 54. If each one of the 4 circuits, from which the arrangements 9, 10 and 29 are implemented, operates correctly, 4 signals of 1860 Hz each must be found at the input of the modulation device 54, each having an accurately defined level.

The modulator 54 modulates the 1860 Hz signals on a carrier with a frequency of 2 kHz. This modulation is performed digitally and consists in that each time the polarity of one out of two consecutive signals in the digital version of a 1860 Hz signal must be reversed. This signal reversal is performed by means of a control signal $C_6$.

In this manner four signals are obtained at the output of the modulator 54, each having a frequency of 3860 Hz. These signals are applied to the input $A_6$ of the time-division multiplexer 40. These signals are selected by the filter 35 and are applied to the 4 outputs $R_6$ of the demultiplexer 36. The level of these components is detected in the detection circuit 55 and the output signal thereof is applied to the alarm circuit 56.

What is claimed is:

1. A digital transmultiplexer for converting a signal consisting of a plurality of telephony signals in TDM-Format, into a signal consisting of the telephony signals in FDM-Format and vice versa, the transmultiplexer comprising an arithmetic unit having a first input and a first output for respectively receiving and supplying, in digital form, said signals in TDM-Format and a second input and a second output for respectively receiving and supplying, in digital form, said signals in FDM-Format, a digital generator also coupled to the first input of said arithmetic unit for generating a pilot signal having a prescribed frequency for said TDM-Format signal to be converted, and filter means coupled to the first output of said arithmetic unit for selecting a pilot signal contained in the signal at said first output for controlling the level of the received FDM-Format signals; wherein, to monitor the proper operation of said arithmetic unit, said transmultiplexer further comprises means coupled to said arithmetic unit for supplying the signals present at said first input, said second input and said second output of said arithmetic unit, as well as the signal present at said first output of said arithmetic unit, to said filter means, whereby said filter means select a signal component having said prescribed frequency from each of said signals supplied thereto, a plurality of detection circuits each for generating a level signal relating to each of said signal components, respectively, and for comparing said respective level signals to respective thresholds, means for coupling said filter means to said detection circuits and means for utilizing the level signals for controlling the level of multiplexed signals.

2. A transmultiplexer as claimed in claim 1 which further comprises an input device and an output device coupled to said first input and said first output of said arithmetic unit, each of said devices comprising a channel filter, wherein to supervise the operation of said input and output devices, said transmultiplexer comprises means for connecting said input and output devices in series during predetermined time intervals, a digital test signal generator coupled to the series arrangement of said input and output devices for providing a digital tone signal having a frequency located in the passband of said channel filters, and a modulation circuit coupled to said series arrangement for applying said digital tone signal, having passed through said series arrangement, to said supplying means whereby said filter means may process the signals therefrom.

* * * * *